United States Patent
Youn et al.

(10) Patent No.: US 12,073,622 B2
(45) Date of Patent: Aug. 27, 2024

(54) RECONFIGURABLE LOGIC CIRCUIT USING OPTIMAL PARAMETER AND METHOD OF OPERATING THE SAME

(71) Applicant: SAMSUNG ELECTRONICS CO., LTD., Suwon-si (KR)

(72) Inventors: Chan-Hyun Youn, Daejeon (KR); Woojoong Kim, Daejeon (KR); Duc Canh Le, Daejeon (KR); Eunyoung Oh, Daejeon (KR); Minsu Jeon, Daejeon (KR)

(73) Assignee: Samsung Electronics Co., Ltd. (KR)

( * ) Notice: Subject to any disclaimer, the term of this patent is extended or adjusted under 35 U.S.C. 154(b) by 285 days.

(21) Appl. No.: 17/449,080

(22) Filed: Sep. 27, 2021

(65) Prior Publication Data
US 2022/0101005 A1    Mar. 31, 2022

(30) Foreign Application Priority Data

Sep. 29, 2020   (KR) ........................ 10-2020-0127550

(51) Int. Cl.
*G06F 15/78* (2006.01)
*G06V 20/40* (2022.01)

(52) U.S. Cl.
CPC .......... *G06V 20/41* (2022.01); *G06F 15/7867* (2013.01)

(58) Field of Classification Search
CPC ........ G06V 20/41; G06V 10/12; G06V 10/94; G06F 15/7867; H04N 17/02
USPC ....................................................... 382/103
See application file for complete search history.

(56) References Cited

U.S. PATENT DOCUMENTS

| | | | |
|---|---|---|---|
| 8,351,510 | B1 | 1/2013 | Masterson et al. |
| 8,976,298 | B2 | 3/2015 | Turkington et al. |
| 8,981,813 | B2 | 3/2015 | Chan et al. |
| 9,185,431 | B2 | 11/2015 | Asamura et al. |
| 10,089,551 | B2 | 10/2018 | Bobbitt et al. |
| 10,540,170 | B2 | 1/2020 | Batchelor et al. |

(Continued)

FOREIGN PATENT DOCUMENTS

| | | |
|---|---|---|
| KR | 10-1868270 | 6/2018 |
| KR | 102082411 | 2/2020 |
| KR | 10-2097905 | 4/2020 |

OTHER PUBLICATIONS

Woo-Joong Kim et al., "Lightweight Online Profiling-Based Configuration Adaptation for Video Analytics System in Edge Computing", IEEE Access, vol. 8, 2020, pp. 116881-116899.

(Continued)

*Primary Examiner* — Stephen P Coleman
(74) *Attorney, Agent, or Firm* — Fish & Richardson P.C.

(57) ABSTRACT

A method of operating a reconfigurable logic circuit includes; receiving a video sequence, profiling throughput of the video sequence with regard to a parameter constituting the reconfigurable logic circuit to generate a profiling result, initializing the parameter to a maximum value, evaluating throughput of the video sequence with regard to a current parameter value based on the profiling result, decreasing the current parameter value when throughput with regard to the current parameter value is not a maximum value, and determining that the current parameter value is an optimal parameter when throughput with regard to the current parameter value is the maximum value, and analyzing the video sequence based on the optimal parameter.

20 Claims, 13 Drawing Sheets

(56) References Cited

U.S. PATENT DOCUMENTS

| | | |
|---|---|---|
| 10,656,962 B2 | 5/2020 | Lin et al. |
| 11,636,670 B2 | 4/2023 | Kim |
| 2017/0339058 A1* | 11/2017 | Zhao .................... H04L 47/783 |
| 2019/0138830 A1 | 5/2019 | Justice et al. |
| 2019/0213029 A1 | 7/2019 | Liu et al. |

OTHER PUBLICATIONS

Office Action in Korean Appln. No. 10-2020-0127550, mailed on Jun. 21, 2024, 11 pages (with English translation).

* cited by examiner

RECONFIGURABLE LOGIC CIRCUIT USING OPTIMAL PARAMETER AND METHOD OF OPERATING THE SAME

CROSS-REFERENCE TO RELATED APPLICATION

This application claims priority under 35 U.S.C. § 119 to Korean Patent Application No. 10-2020-0127550 filed on Sep. 29, 2020 in the Korean Intellectual Property Office, the subject matter of which is hereby incorporated by reference.

BACKGROUND

The inventive concept relates generally to reconfigurable logic circuits, and more particularly, to reconfigurable logic circuits using optimized parameter(s), as well as method of operating same.

Due to recent demands for mobile services (e.g., virtual/augmented reality) based on the latest video analysis technology, such as object detection based on a deep neural network (DNN), it has become necessary to provide smooth, real-time video analysis to end users of mobile devices.

A reconfigurable accelerator, such as a field programmable gate array (FPGA), may be used to improve processing speed of video analysis. One physical FPGA may operate digital logic by using at least one virtual FPGA (vFPGA). However, bottlenecking interference may occur between different vFPGAs.

SUMMARY

Embodiments of the inventive concept minimize deterioration in the throughput of a FPGA due to interference between virtual vFPGAs in order to satisfy real-time processing and minimum accuracy requirements for video processing.

According to an aspect of the inventive concept, there is provided a method of operating a reconfigurable logic circuit. The method includes; receiving a video sequence, profiling throughput of the video sequence with regard to a parameter constituting the reconfigurable logic circuit to generate a profiling result, initializing the parameter to a maximum value, evaluating throughput of the video sequence with regard to a current parameter value based on the profiling result, decreasing the current parameter value when throughput with regard to the current parameter value is not a maximum value, and determining that the current parameter value is an optimal parameter when throughput with regard to the current parameter value is the maximum value, and analyzing the video sequence based on the optimal parameter.

According to an aspect of the inventive concept, there is provided a method of operating a reconfigurable logic circuit. The method includes; receiving a video sequence, profiling throughput of the video sequence with regard to parameters of the reconfigurable logic circuit including a first parameter and a second parameter to generate a profiling result, initializing the first parameter to a first maximum value, initializing the second parameter to a second maximum value, optimizing the first parameter by searching for a first optimal parameter value maximizing throughput of the video sequence by decreasing a first parameter value of the first parameter based on the profiling result, receiving a modified video sequence resulting from a processing of the video sequence based on the first optimal parameter value, optimizing the second parameter by searching for a second optimal parameter value maximizing throughput of the modified video sequence by decreasing a second parameter value of the second parameter based on the profiling result, and analyzing the modified video sequence based on the first optimal parameter value and the second optimal parameter value.

According to an aspect of the inventive concept, there is provided a reconfigurable logic circuit controlled with regard to a parameter. The reconfigurable logic circuit includes; a field programmable gate array (FPGA) block including at least one virtual FPGA (vFPGA), a configuration controller configured to profile a video sequence for the parameter and search for an optimal parameter value that maximizes throughput of the FPGA block for the video sequence, and a task manager configured to map the video sequence to the at least vFPGA to which the optimal parameter value is applied, wherein the configuration controller gradually decreases a parameter value of the parameter from a maximum value.

BRIEF DESCRIPTION OF THE DRAWINGS

The making and use of the inventive concept may be more clearly understood upon consideration of the following detailed description together with the accompanying drawings in which.

DETAILED DESCRIPTION

Throughout the written description and drawings, like reference numbers and labels are used to denote like or similar elements, features and/or method steps.

Figure 1:
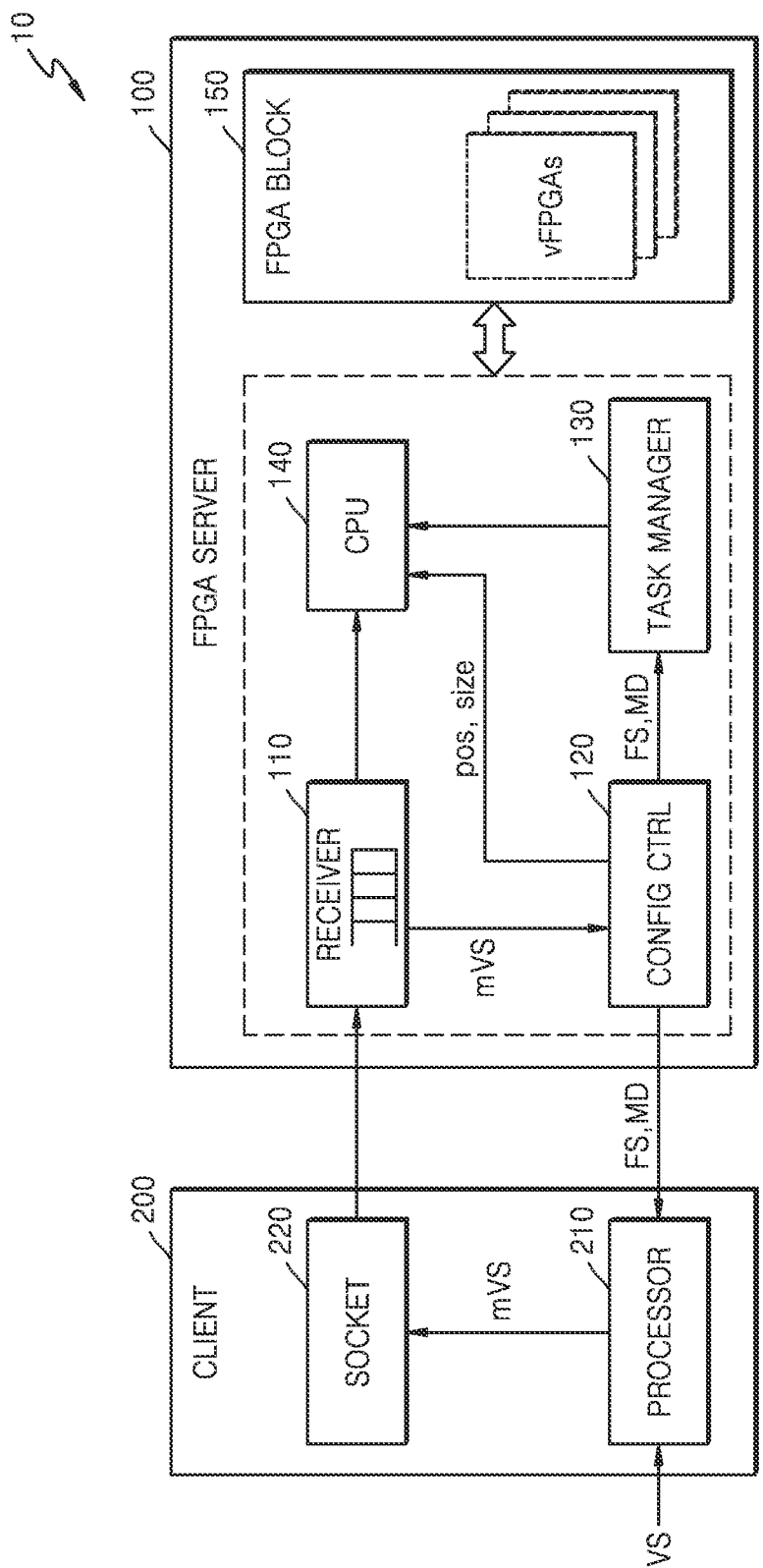
FIG. 1 is a block diagram illustrating an electronic system including a reconfigurable logic circuit according to embodiments of the inventive concept.

Figure (FIG. 1 is a block diagram illustrating an electronic system 10 including a reconfigurable logic circuit according to embodiments of the inventive concept. Here, a server 100 serves as the reconfigurable logic circuit.

In some embodiments, the electronic system 10 may be a video analysis system supporting video analysis. That is, a video analysis system consistent with an embodiment of the inventive concept may be an electronic system providing and/or managing video analysis with respect to a video sequence transmitted by a user. A video sequence may be a set of video frames captured every unit time, and the video frames may share one image capturing scenario. Assuming that the video sequence is high-capacity and high-resolution, the video sequence may be processed much faster by a server (e.g., a large-scale processing device including an accelerator specialized for graphics processing) than may be processed by hardware/software resources provided by the user's electronic device (e.g., a mobile device or a camera device). In this regard, the term "server" as used herein denotes a large-scale processing device including an accelerator. In contrast, a user's electronic device may be referred to as a "client."

In the context of a "video analysis system" according to embodiments of the inventive concept, one or more "parameters" may exist as corresponding elements of the electronic system 10. These parameters may include at least one controllable element. For example, it is assumed that electronic system 10 runs at a sampling rate for generating a frame. It is further assumed that the electronic system 10 includes an object recognition model. Here, the sampling rate and the objection recognition model are parameters.

Extending these example, values for the sampling rate may be (e.g.,) 60, 30, 10, 5, 2, and 1 frame(s) per second (fps), and the object recognition model may include a You Only Look Once (YOLO), a single shot detection (SSD) and/or a faster region-based convolutional neural network (R-CNN). However, the proposed sampling rates and object recognition model are not limited thereto.

In various embodiments of the inventive concept, the object recognition model may include one or more of; a convolution neural network (CNN) (e.g., GoogleNet, AlexNet, and VGG Network), a region proposal network (RPN), a recurrent neural network (RNN), a stacking-based deep neural network (S-DNN), a state-space dynamic neural network (S-SDNN), a deconvolution network, a deep belief network (DBN), a restricted Boltzman machine (RBM), a fully convolutional network, a long short-term memory (LSTM) network, and a classification network.

Here, the object recognition model may follow the same object recognition algorithm, but there may case(s) in which only resolutions of video frames are different from one another. For example, a YOLO used as an object recognition method may include at least one of YOLO-320, YOLO-416 and YOLO-618—respectively corresponding to video frame resolutions of 320×320, 416×416, and 618×618 (e.g., width×height).

Referring to FIG. 1, the electronic system 10 generally includes the server 100 and a client 200.

The server 100 is assumed to be a large-capacity, high-speed computing device capable of rapidly processing a video sequence using an accelerator specifically capable of processing graphics. The server 100 may communicate with the client 200 via a wired/wireless communication network including a main frame, a public network and/or a local area network (LAN). The server 100 is further assume to be implemented with a reconfigurable logic circuit, such as a FPGA. Accordingly, in some embodiments, the server 100 may be referred to as an FPGA server.

In the illustrated example of FIG. 1, the server 100 includes a receiver 110, a configuration controller 120, a task manager 130, a central processing unit (CPU) 140, and an FPGA block 150.

The receiver 110 may receive data from the client 200. In some embodiments, the client 200 may receive a modified video sequence (mVS) by modifying a video sequence VS, and the receiver 110 may receive the modified video sequence mVS. Because the modified video sequence mVS including consecutive video frames cannot be processed at once, the modified video sequence mVS may be stored in a queue associated with the receiver 110. As such, the modified video sequence mVS stored in the queue may be sequentially provided to the configuration controller 120. Additionally, the receiver 110 may transfer information regarding the video sequence to the CPU 140. Such "video sequence information" may include (e.g.,); size(s) of video frame(s), an order of the video frames stored in a queue, stored location(s) for the video frames, etc.

The configuration controller 120 may determine parameters to be applied to the server 100 based on the modified video sequence mVS. For example, the configuration controller 120 may adjust and optimize a sampling rate FS and/or an object recognition model MD as parameters. The sampling rate FS may be a speed at which the modified video sequence mVS is sampled, and the object recognition model MD may be an object recognition algorithm or a resolution to be applied to the modified video sequence mVS. In some embodiments, the server 100 may process the modified video sequence mVS according to the sampling rate FS determined by the configuration controller 120. That is, by applying the object recognition model MD to the modified video sequence mVS, an object in a video frame may be detected and classified through (e.g.,) a machine learning algorithm.

In some embodiments, the configuration controller 120 may provide a determined sampling rate FS and/or a determined object recognition model MD to the client 200. A processor 210 associated with the client 200 may generate the modified video sequence mVS by processing the video sequence VS according to parameters to be applied by the server 100 (e.g., the sampling rate FS and/or the object recognition model MD).

In some embodiments, the configuration controller 120 may provide a determined sampling rate FS and/or a determined object recognition model MD to the task manager 130. Additionally, the configuration controller 120 may provide a result of processing a video frame to the CPU 140. A result of processing a video frame may include a position (pos) and sizes of objects recognized in the video frame. One example of the configuration controller 120 will be described in some additional detail with reference to FIG. 3.

The task manager 130 may map the modified video sequence mVS to an FPGA based on the sampling rate FS and/or the object recognition model MD. In some embodiments, the task manager 130 may check optimized parameters (e.g., the sampling rate FS and/or the object recognition model MD) in the configuration controller 120 and may allocate the modified video sequence mVS to the virtual FPGA vFPGA that has been previously set according to optimized parameters.

For example, when a first video sequence VS1 is optimized by a first sampling rate FS1 and a first object recognition model MD1, the task manager 130 may transplant the first sampling rate FS1 and the first object recognition model MD1 into a first virtual FPGA vFPGA1 from among the plurality of virtual FPGA vFPGAs of the FPGA block 150, and the task manager 130 may map the first video sequence VS1 to the first virtual FPGA vFPGA1. Similarly, when it is determined that a second video sequence VS2 following the first video sequence VS1 is optimized by a second sampling rate FS2 and a second object recognition model MD2, the task manager 130 may transplant the second sampling rate FS1 and the second object recognition model MD2 into a second virtual FPGA vFPGA2 from among the virtual FPGA vFPGAs, and the task manager 130 may map the second video sequence VS2 to the second virtual FPGA vFPGA2.

A processing result of the task manager 130 including a mapping result with respect to a video frame may be provided to the CPU 140. One example of the task manager 130 will be described in some additional detail hereafter with reference to FIG. 4.

The receiver 110, the configuration controller 120, and the task manager 130 may be implemented as hardware processing circuitry including logic circuits, and/or as a combination of hardware and software (e.g., a processor executing software). However specifically implemented, the receiver 110, the configuration controller 120, and the task manager 130 may collectively perform parameter determination and optimization operations, as well as assignment operations. Exemplary processing circuitry may include, for example, a CPU, an arithmetic logic unit (ALU) performing arithmetic operations, logic operations, bit shifting, etc., a digital signal processor (DSP), a microprocessor, an application specific integrated circuit (ASIC), etc.

The CPU 140 may control the overall operation of the server 100. Thus, the CPU 140 may be implemented as a single core device or a multi-core device. The CPU 140 may process or execute programs and/or data stored in one or more external memories (not shown). For example, the CPU 140 may control functions of the server 100 by executing programs stored in memory. The CPU 140 may variously receive processing results from the receiver 110, the configuration controller 120, and the task manager 130 and may provide control signals for controlling the operation (and interoperation) of the receiver 110, the configuration controller 120, and the task manager 130.

The FPGA block 150 may include at least one FPGA, wherein the at least one FPGA may include at least one vFPGA. In an FPGA, which is a physical logic circuit, the entire memory may be reconfigured during an FPGA reconfiguration process, and the entire FPGA may be maintained in an inactivated state. Therefore, a possible restriction of resources may arise.

In this regard, the FPGA block 150 of FIG. 1 may support a partial reconfiguration function, wherein the partial reconfiguration function is a function in which only some of logic resources of an FPGA internal memory are reconfigured, and an original FPGA function may be kept activated for the remaining logic resources. To use the partial reconfiguration function, a user may predetermine and set a number of partial reconfiguration regions divided from the resources of the FPGA, as well as size(s) for each of the partial reconfiguration regions. The partial reconfiguration may reduce a delay time, because the size of a region that needs to be reconfigured is relatively small, as compared with the size of a wholly reconfigured FPGA.

In some embodiments, the FPGA block 150 may support the vFPGA, wherein the vFPGA may be a virtualized logical processing region capable of operating a digital logic according to one physical FPGA. As the vFPGA is supported, resources of one physical FPGA may be separated and allocated for execution of a plurality of applications, and thus, efficiency may be improved by processing the applications using respective, separate resources.

In some embodiments, the FPGA block 150 may include a partial reconfiguration-based virtualized FPGA (PR-vFPGA). Since the PR-vFPGA is one vFPGA capable of operating an independent service having partial logic resources of one physical FPGA and a corresponding digital logic, the PR-vFPGA enables independent video analysis processing regardless of other PR-vFPGAs.

Thus, in some embodiments, the FPGA block 150 may set the vFPGA according to optimal parameters. Accordingly, each vFPGA may process a video sequence corresponding to the optimal parameters from among a plurality of modified video sequences mVS, thereby improving the accuracy of object recognition and also minimizing latency. The FPGA block 150 of FIG. 1 will be described in some additional detail hereafter with reference to FIG. 5.

Those skilled in the art may therefore understand the FPGA block 150 as a device, since the FPGA block 150 functions as a processing circuit for processing a video sequence. Accordingly, the receiver 110, the configuration controller 120, the task manager 130 and the CPU 140 may be relatively understood as a host, because they transplant parameters to the FPGA block 150 and allocate a video sequence.

It follows that the FPGA block 150 (a "device") may communicate with the receiver 110, the configuration controller 120, the task manager 130, and the CPU 140 (collectively, a "host") using (e.g.,) a PCI express (PCIe) protocol. However, the inventive concept is not limited thereto, and the communication may be performed using one or more protocol(s) to which various heterogeneous device communication protocols like a universal flash storage (UFS) protocol, an embedded multi-media card (eMMC) protocol, and a non-volatile memory express (NVMe) protocol have been applied.

As noted above, the client 200 may be an electronic device including a mobile device, a camera device, etc., wherein the client 200 of FIG. 1 includes the processor 210 and a socket 220.

The processor 210 may receive the video sequence VS as raw data. In some embodiments, the processor 210 may process the video sequence VS according to predetermined parameters or may process the video sequence VS based on parameters FS and MD provided from the server 100. The processor 210 may perform pre-processing on the video sequence VS such that the video sequence VS may be easily processed by the server 100. However, the inventive concept is not limited thereto, and the processor 210 may perform various processing on video frames.

In some embodiments, the processor 210 may receive the sampling rate FS from the server 100 and generate the modified video sequence mVS by sampling the video sequence VS at an optimal sampling rate to be processed in the FPGA. Thus, the processor 210 may receive the sampling rate FS and the object recognition model MD, sample the video sequence VS at an optimal sampling rate to be processed at the FPGA, and down-sample the video sequence VS to an optimal resolution to be processed at the FPGA, thereby generating the modified video sequence mVS. Further, in some embodiments, the processor 210 may generate the modified video sequence mVS by applying a preset sampling rate FS and a preset object recognition model MD to the video sequence VS.

The modified video sequence mVS may be provided to the socket 220, and the socket 220 may provide the modified video sequence mVS from the client 200 to the server 100.

In an example embodiment, the socket 220 may connect an end device (i.e., the client 200) to the server 100 within a communication network. The modified video sequence mVS may be accumulated in a queue of the receiver 110.

In some embodiments, the server 100 may be configured to include a reconfigurable logic circuit including one or more parameters and/or various combinations of parameters. Thus, throughput (e.g., processing performance) of the reconfigurable logic circuit may vary. In this regard, throughput may vary according to resource consumption, latency, and accuracy. Accordingly, a method of adaptively adjusting the configuration of the reconfigurable logic circuit in order to improve throughput is an important consideration.

Embodiments of the inventive concept provide method(s) of determining optimal parameters capable of maximizing the throughput for vFPGAs. As optimal parameters are determined, the throughput of the reconfigurable logic circuit may be optimized (e.g., processing latency may be minimized, processing accuracy may be maximized, etc.).

Figure 2:
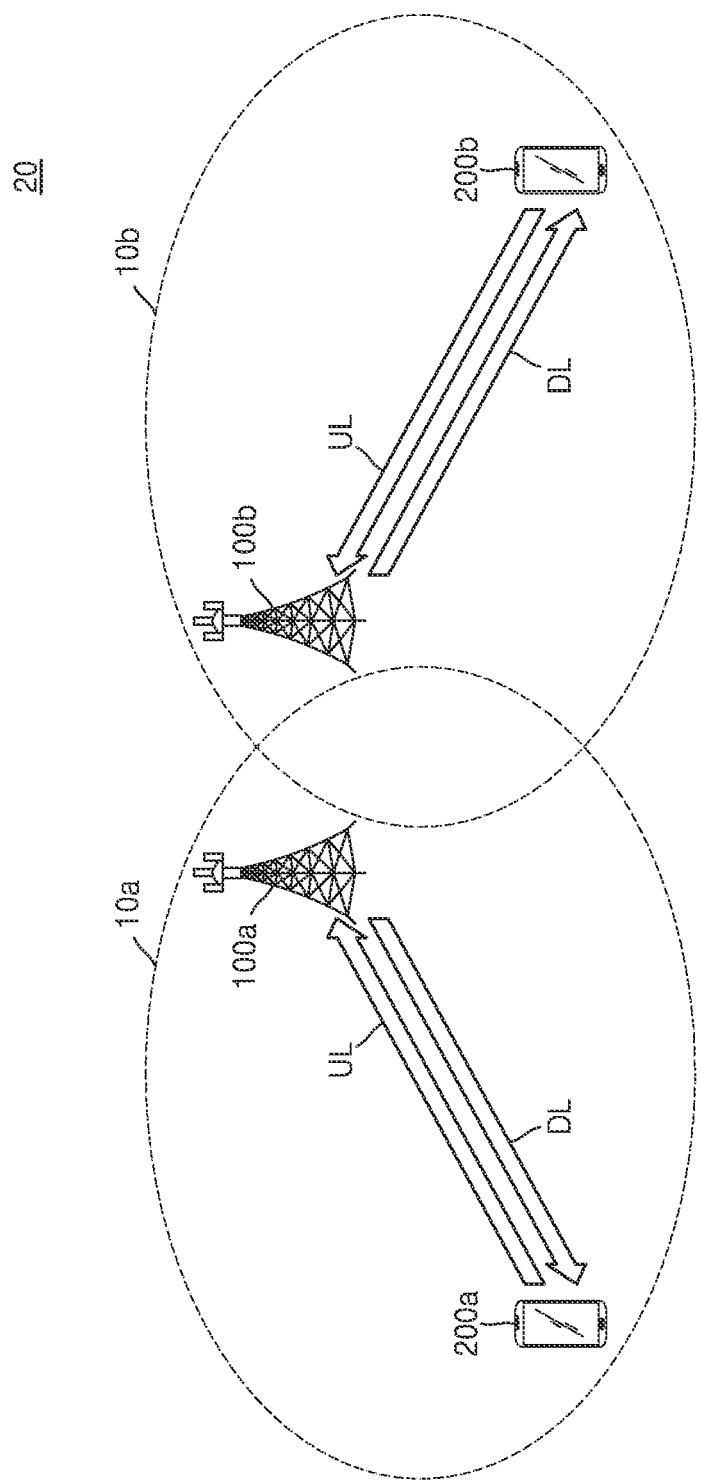
FIG. 2 is a conceptual diagram illustrating communication between a client and a server in an electronic system according to embodiments of the inventive concept.

FIG. 2 is a conceptual diagram illustrating communication between clients 200a and 200b and servers 100a and 100b in an electronic system 20 according to embodiments of the inventive concept.

Referring to FIGS. 1 and 2, a first electronic system 10a and a second electronic system 10b may be implementation examples of the electronic system 10 of FIG. 1. Thus, the first client 200a and the second client 200b may be implementation examples of the client 200 of FIG. 1, and the first server 100a and the second server 100b may be implementation examples of the server 100 of FIG. 1. The first server 100a and the second server 100b may be included in a base station in the form of reconfigurable logic circuits or may be provided near the base station.

The electronic system 20 may be understood as a communication network (or a data processing network) associated with a plurality of electronic systems. Thus, in the first electronic system 10a, the first client 200a may transmit a video sequence to the first server 100a. Here, the video sequence transmitted from the first client 200a to the first server 100a may be referred to as an "up-link" (UL). In this regard, the first server 100a may determine optimal parameters with respect to a video sequence and provide the optimal parameters to the first client 200a. Parameters transmitted from the first server 100a to the first client 200a may be referred to as a "down-link" (DL). In the second electronic system 20b, the second client 200b may transmit a video sequence to the second server 200b with similar, resulting designations of a UL and DL.

As next generation media services, such as 4K Ultra-High Definition (UHD) and augmented/virtual reality (VR/AR) video, become more prevalent, technology for efficiently analyzing and processing real-time video sequences of an end-user (or client) are increasingly in demand. However, due to delays occurring in end-to-end (E2E) transmission through a wireless communication network and a backhaul network, as well as high-cost video analysis delays occurring during content transmission, real-time quality of service (QoS) may not be guaranteed to an end user. (Here, in the context of the foregoing example, an exemplary E2E transmission may be a communication between the first server 100a and the second server 100b).

To resolve such problems, mobile edge computing (MEC) may be applied, wherein MEC is technology for arranging a service or content to computing or storage resources of a base station located close to an end user, thereby reducing delays of an E2E transmission and dispersing backhaul traffic (e.g., a communication load between the first server 100a and the second server 100b). In an MEC environment, computing and storage resources of each base station may be operated in the form of an edge server. For example, the first server 100a and/or the second server 100b provided near the base station may be referred to as edge servers. Because an edge server is located close to an end user, region-specific services may be provided, and the mobility for each service may be supported by utilizing characteristics of the base station. Also, edge servers of each base station are capable of performing communication and cooperation without network congestion without passing through a backhaul network, thereby providing further improved real-time performance and flexibility in providing services.

The MEC may provide real-time video analytics for a next-generation media service through proximity of directly providing computing and storage resources to an end user or a client (e.g., the first client 200a and/or the second client 200b) at the level of a base station (e.g., the first server 100a and/or the second server 100b). However, computing and storage resources provided by edge servers are limited and may be easily overloaded by a plurality of end users. Therefore, there is a need for an adaptive and cost-effective real-time video analysis processing system technology capable of supporting a predetermined level of service performance with maximum utilization of resources provided by edge servers.

An FPGA-based edge server may improve efficiency by assigning video sequences to PR-vFPGAs by partially reconfiguring computing resources for each video sequence that ensures performance and increases cost efficiency. Because a bottlenecking interference phenomenon may result between PR-vFPGAs in one physical FPGA, it is necessary to minimize the interference for minimizing performance deterioration.

According to embodiments of the inventive concept, parameters of the server 100 may be optimized using PR-vFPGA resource allocation when video analysis of a plurality of video sequences is performed on FPGA computing resources of an edge server (i.e., a reconfigurable logic circuit). Accordingly, parameters (e.g., a sampling rate and/or an object recognition model) optimized for each of a plurality of video sequences may be determined, and a PR-vFPGA may be set with the optimized parameters while receiving a video sequence to which the optimized parameters are applied. In some embodiments, the server 100 as a reconfigurable logic circuit may guarantee a predetermined level or higher accuracy and minimize deterioration of processing delay performance Thus, a parameter may be initialized to a maximum value and then may be gradually decreased. Hence, the server 100 may calculate a deterioration rate of accuracy throughput of a video sequence per latency reduction rate for processing the video sequence every time a parameter value is reduced by one level and may determine a parameter having the smallest deterioration rate of accuracy throughput of a video sequence per latency reduction rate for processing the video sequence as an optimal parameter.

Figure 3:
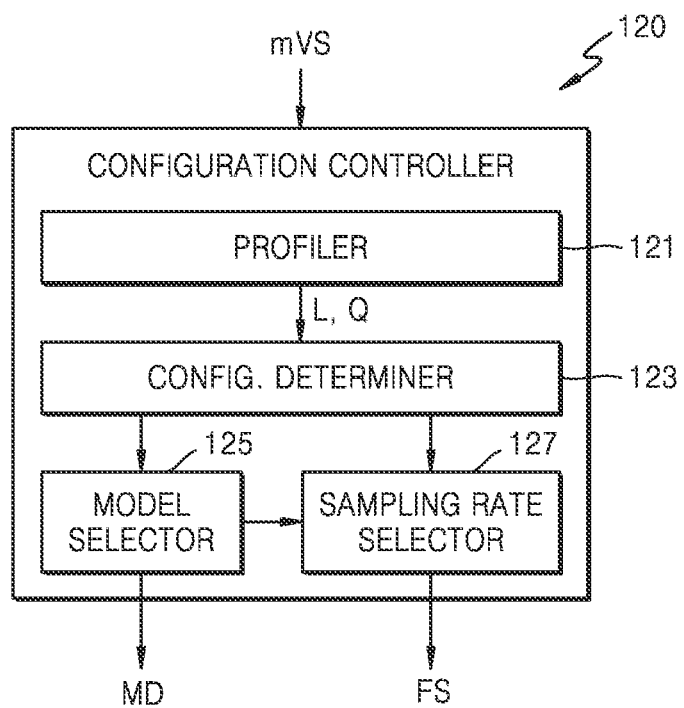
FIG. 3 is a block diagram further illustrating in one example the configuration controller 120 of FIG. 1.

FIG. 3 is a block diagram further illustrating in one example the configuration controller 120 of FIG. 1.

Here, the configuration controller 120 may profile relationship information regarding accuracy and a latency according to a calculation process for each video sequence corresponding to a service user request and, based on the relationship information, may search for and determine an optimal frame resolution and an optimal frame sampling rate for satisfying a demanded quality of service (QoS).

The configuration controller 120 may receive the modified video sequence mVS and output the sampling rate FS and/or the object recognition model MD as parameters. The configuration controller 120 of FIG. 3 may include a profiler 121, a configuration determiner 123, a model selector 125, and a sampling rate selector 127.

The profiler 121 may pre-test throughput that the FPGA block 150 processes the modified video sequence mVS according to parameters and may store a result of the pre-test. In some embodiments, the profiler 121 may combine all sampling rate values and all object recognition model values as parameters, and may simulate processing latencies L and processing accuracies Q of the FPGA block 150 according to results of combining the parameters one by one. A process performance checking operation for parameters may be performed before a video sequence is input. The profiler 121 may provide the configuration determiner 123 with processing latencies L and processing accuracies Q according to combinations of all parameters as a result of the process performance checking operation.

The configuration determiner 123 may perform and process calculations for determining parameters for configuration of an FPGA based on a processing latency L and a processing accuracy Q.

In some embodiments, the model selector 125 may determine an optimal object recognition model value based on a result of a calculation of the configuration determiner 123 and output the object recognition model MD as a parameter. Thus, the object recognition model MD may be provided to the client 200 of FIG. 1, and the processor 210 may generate the modified video sequence VS by down-sampling the video sequence VS to have an optimal resolution.

In some embodiments, the sampling rate selector 127 may determine an optimal sampling rate value based on a result of a calculation of the configuration determiner 123 and may output the sampling rate FS as a parameter. Thus, the sampling rate FS may be provided to the client 200 (FIG. 1), and the processor 210 may generate the modified video sequence VS by sampling the video sequence VS such that video frames are generated at an optimal sampling rate.

Here, video from at least one modified video sequence mVS may be analyzed using FPGA computing resources of the server 100 of FIG. 1. Accordingly, the configuration controller 120 may determine parameters (e.g., a sampling rate and/or an object recognition model) optimized for each of a plurality of video sequences and may configure a PR-vFPGA to achieve optimized throughput by receiving a video sequence to which optimized parameters are applied and outputting the optimized parameters.

The configuration determiner 123 may perform the following calculations using the following mathematical symbols:

$vs_i$: i-th video sequence (total I video sequences);
$MD_i$: $vs_i$ (determined value of $MD_i$ may indicate an input frame resolution of an object recognition model);
$FS_i$: $vs_i$ sampling rate for video frames;
$c_i=\{MD_i, FS_i\}$: configuration of i-th video sequence, where $C=\{c_i | i \forall [I]\}$, $[I]=\{1, 2, \ldots, I\}$.

Hence, an object recognition model $vs_i$ of each video sequence $MD_i$ may be transplanted into an FPGA included in the server 100 in the form of a PR-vFPGA. And when a total computing resource capacity of the FPGA block 150 is defined as F and a resource capacity of a PR-vFPGA allocated to the object recognition model $vs_i$ of each video sequence $MD_i$ is defined as $f_i$, it is necessary to satisfy Equation 1 as follows:

$$\Sigma_{i \in [I]} f_i \leq F \qquad \text{[Equation 1]}$$

Here, a total amount of resource capacity of a PR-vFPGA allocated to each video sequence $vs_i$ needs to be less than the total computing resource capacity F of the FPGA block 150 to operate an FPGA.

The performance of a video analysis latency L according to an object recognition model i of an $vs_i$-th video sequence $MD_i$ extracted through an FPGA throughput profiling of the profiler 121 may be modeled by Equation 2 as follows.

$$l_i^P(MD_i) = \gamma_1 * MD_i^2 - \gamma_2 * MD_i + \gamma_3 \qquad \text{[Equation 2]}$$

According to Equation 2, a latency per second of the PR-vFPGA of the i-th video sequence to which a partial reconfiguration region is allocated and an object recognition model is $l_i^P$. Further, in Equation 2, each frame transmission latency i according to the object recognition model $vs_i$ of the $MD_i$-th video sequence $l_i^T$ may be modeled by Equation 3 as follows:

$$l_i^T(MD_i) = \frac{\delta * (MD_i)^2}{b_i} \qquad \text{[Equation 3]}$$

Here, $b_i$ denotes a bandwidth (MB/s) given to an i-th video sequence $vs_i$, and $\delta$ denotes an amount of data needed to express one pixel.

A video analysis accuracy according to the object recognition model i and the sampling rate $vs_i$ of the $MD_i$-th video sequence $FS_i$ extracted through an FPGA throughput profiling of the profiler 121 may be modeled by Equation 4 as follows:

$$a_i(c_i) = \in_i (MD_i) * \phi_i(FS_i) \qquad \text{[Equation 4]}$$

From the foregoing, a video analysis accuracy model i regarding a configuration $vs_i$ of the $c_i$-th video sequence $a_i$ may be expressed as a product of an accuracy model $MD_i$ regarding the object recognition model $\in_i$ and an accuracy model $FS_i$ regarding the sampling rate $\phi_i$. According to Equation 4, the higher a frame resolution is, the higher the analysis accuracy becomes. Also, the higher the frame resolution is, the smaller the performance improvement becomes. In other words, the higher a frame rate is, the higher the analysis accuracy becomes, Also, the higher the frame rate is, the less the performance is improved.

In consideration of these characteristics, accuracy models $\in_i$ and $\phi_i$ may be defined by Equation 5 and Equation 6 as follows:

$$\epsilon_i(MD_i) = \alpha_1 - \alpha_2 * e^{-\frac{MD_i}{\alpha_3}} \qquad \text{[Equation 5]}$$

$$\phi_i(FS_i) = \beta_1 - \beta_2 * e^{-\frac{FS_i}{\beta_3}} \qquad \text{[Equation 6]}$$

Here, $\{\alpha_1, \alpha_2, \alpha_3\}$ and $\{\beta_1, \beta_2, \beta_3\}$ are positive numbers determined through profiling.

Thus, according to Equation 5 and Equation 6, accuracy is not significantly decreased for a frame sampling rate and an object recognition model having large values, but is gradually decreased. However, accuracy is rapidly decreased for a frame sampling rate and an object recognition model having small values. The style of accuracy model will be described hereafter in some additional detail with reference to FIGS. 11A and 11B.

In some embodiments, the configuration determiner 123 may initialize a sampling rate value and an object recognition model value of each video sequence to maximum values. A sampling rate $vs_i$ and an object recognition model $FS_i$ for video frames of an i-th video sequence $MD_i$ have selectable ranges, respectively. Selectable minimum and maximum values of the sampling rate $FS_i$ are $s_{min}$ and $s_{max}$, respectively, and selectable minimum and maximum values of the object recognition model $MD_i$ are $r_{min}$ and $r_{max}$, respectively.

Determination of an optimal configuration of a frame sampling rate and an object recognition model for minimizing deterioration of processing latency performance while ensuring accuracy of a predetermined level or more in video analysis for a video sequence in FPGA computing resources of the server 100 may be defined according to Equation 7 as follows:

$$\max_c \sum_{i \in [I]} u_i(c_i) = \sum_{i \in [I]} a_i(c_i) - \sigma * \sum_{i \in [I]} FS_i$$

$$\text{s.t.} \sum_{i \in [I]} f_i < F$$

$$FS_i < \frac{1}{l_i(MD_i)}, \forall i \in [I]$$

Here, σ is a ratio between a total sum of analysis accuracies in all video sequences and a total number of frames that are input and processed per second in a system, $u_i(c_i)=a_i(c_i)-\sigma*FS_i$ is the utility of an i-th video sequence, and similar Equation 1, the sampling rate $FS_i$ of each video sequence needs to be less than one frame processing rate of a determined object recognition model.

In some embodiments, the configuration determiner 123 may initialize a frame sampling rate and an object recognition model of a video sequence to a maximum value and a maximum model that may be configured to each video sequence, before the video sequence is processed.

Thereafter, the configuration determiner 123 may gradually reduce the value of the object recognition model MD of each video sequence one level by one level until the object recognition model MD of each video sequence may be transplanted to the resource capacity of the FPGA block 150. Accordingly, the resolution of a video sequence may be decreased one level by one level.

For example, when a YOLO-608 from among object recognition models MD applied to video sequences is not able to be transplanted to the FPGA block 150 due to excessive resource, the YOLO-608 may be lowered by one level to a YOLO-416 from among the object recognition models MD. Similarly, when the YOLO-416 from among object recognition models MD applied to video sequences is not able to be transplanted to the FPGA block 150 due to excessive resource, the YOLO-416 may be lowered by one level to a YOLO-320 from among the object recognition models MD.

From among values of the object recognition models MD determined through the above-described process, the optimal value determines a resource size of a PR-vFPGA allocated to each video sequence. The optimal value is found by minimizing deterioration of video analysis accuracy of each video sequence.

To optimize the object recognition model MD, an operation defined by Equation 8 may be performed as follows:

$$e_i^{MD} = \frac{a_i(MD_i) - a_i(MD_i')}{l_i^P(MD_i) - l_i^P(MD_i')}, \forall i \in [I], \quad \text{[Equation 8]}$$

Referring to Equation 8, accuracy performance deterioration per reduction of video analysis latency when the object recognition model $MD_i$ of a video sequence is set to a model having one level lower value may be repeatedly calculated. Here, a next object recognition model $MD_i'$ may be a model one level lower than the object recognition model i of a current $vs_i$-th video sequence $MD_i$, and $a_i(MD_i)$ denotes an accuracy model having only the object recognition model $FS_i$ as a variable while the sampling rate $MD_i$ is fixed.

In some embodiments, the configuration determiner 123 may lower the value of an object recognition model of a video sequence corresponding to the smallest accuracy performance deterioration per reduction of video analysis latency by one level, per Equation 9 as follows:

$$MD_i^* = \text{argmin}_{MD_i'} e_i^{MD} = \text{argmin}_{MD_i'} \frac{a_i(MD_i) - a_i(MD_i')}{l_i^P(MD_i) - l_i^P(MD_i')}, \quad \text{[Equation 9]}$$

$$\forall i \in [I],$$

It is determined whether a newly updated C satisfies Equation 2. When Equation 2 is not satisfied, the above-stated process is repeated until Equation 2 is satisfied. In an example embodiment, the configuration determiner 123 may compare performance corresponding to all parameter values checked through profiling with current performance (i.e., accuracy performance deterioration per video analysis latency reduction) and may check whether the current performance is a maximum value.

The object recognition model of each video sequence determined through the above-described process may be defined as an optimal object recognition model $MD_i^*$, $\forall i \in [I]$.

In some embodiments, the configuration controller 120 may provide an optimal object recognition model MD* to the client 200, and the client 200 may generate the modified video sequence mVS by sampling the video sequence VS at an optimal resolution.

In some embodiments, the configuration determiner 123 may optimize additional parameters after the optimal object recognition model MD* is determined.

Thus, the server 100, which is based on an FPGA, may determine a sampling rate FS for video frames that minimizes accuracy performance deterioration and interference between PR-vFPGAs in video analysis for a plurality of video sequences. The higher the sampling rate FS is set to be, the higher the video analysis accuracy may be. However, a degree of interference occurring between vFPGAs may also be increased. On the other hand, the lower the sampling rate FS is set to be, the lower the video analysis accuracy becomes. However, a degree of interference occurring between vFPGAs may be decreased.

To optimize the sampling rate FS, the following operation(s) may be performed, wherein the initial value of the sampling rate $MD_i^*$ may be reset using the optimal object recognition model $FS_i$, as shown in Equation 10.

$$FS_i = \frac{1}{l_i^P(fMD_i^*)}, \forall i \in [I] \quad \text{[Equation 10]}$$

Here, when the value of the sampling rate $MD_i^*$, $\forall i \in [I]$ is decreased by one level while the optimal object recognition model $FS_i$ is fixed, the configuration determiner 123 may calculate a degree of utility reduction of each video sequence according to Equation 11 as follows:

$$e_i^{FS} = u_i(FS_i) - u_i(FS_i'), \forall i \in [I], \quad \text{[Equation 11]}$$

Thus, the configuration determiner 123 may lower the sampling rate $FS_i$ of the video sequence corresponding to the smallest degree of utility reduction to a one-level lower model.

$$FS_i^* = \operatorname{argmin}_{FS_i'} e_i^{FS} = \operatorname{argmin}_{FS_i'} u_i(FS_i) - u_i(FS_i'), \forall i \in [I], \quad \text{[Equation 12]}$$

According to Equation 12, it may be understood that a parameter value of the sampling rate FS has converged when the previous process is repeated and $FS_i'$ is not changed even when the previous process is repeated for a predetermined number of times. In this case, the value of the sampling rate may be determined as the optimal sampling rate $FS_i^*$. In some embodiments, the configuration determiner 123 may compare performance corresponding to all parameter values checked through profiling with current performance (i.e., accuracy performance deterioration per video analysis latency reduction) and may check whether the current performance is a maximum value.

The sampling rate FS of each video sequence determined through the above process is defined as $FS_i^*$, $\forall i \in [I]$. Accordingly, the configuration determiner 123 may determine an optimal configuration through the above-described process and define the optimal configuration as $C^* = \{c_i^* | \forall i \in [I]\}$, $c_i^* = \{fr_i^*, fs_i^*\}$.

Figure 4:
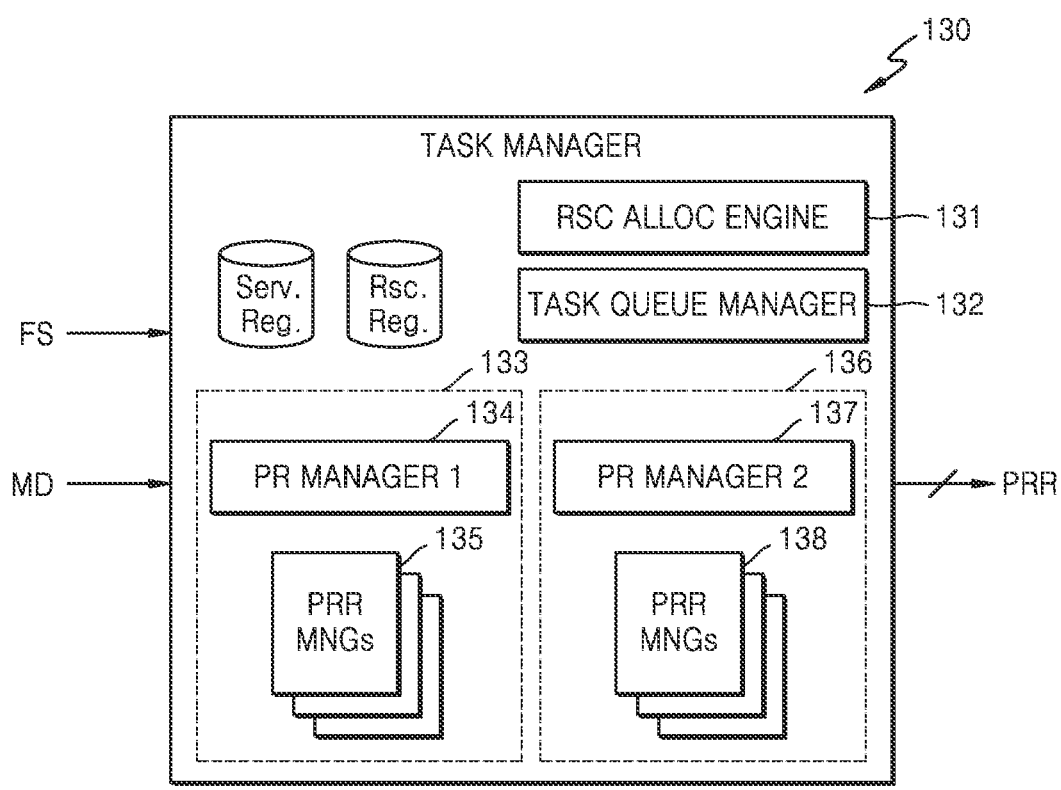
FIG. 4 is a block diagram further illustrating in one example the task manager 130 of FIG. 1.

FIG. 4 is a block diagram further illustrating in one example the task manager 130 of FIG. 1.

Here, the task manager 130 may map the modified video sequence mVS to the FPGA block 150 based on the sampling rate FS and/or the object recognition model MD and may provide a mapping result to the CPU 140. According to an example embodiment of the inventive concept, the task manager 130 may check optimized parameters (e.g., the sampling rate FS and/or the object recognition model MD) in the configuration controller 120 and may allocate the modified video sequence mVS to the virtual FPGA vFPGA that is previously set, according to an optimal sampling rate $FS^*$ and/or the optimal object recognition model $MD^*$.

In the illustrated example of FIG. 4, the task manager 130 includes a resource allocation engine 131, a task queue manager 132, a first management module 133, and a second management module 136.

Referring to FIGS. 1 and 3, the resource allocation engine 131 may allocate a video sequence to a PR-vFPGA to which optimized parameters are applied. As a video sequence is allocated to a PR-vFPGA, the total available resources of the FPGA block 150 may be reduced by an amount corresponding to the allocated video sequence.

In some embodiments, the resource allocation engine 131 may search for a PR-vFPGA resource having a reconfiguration overhead that may be driven by the optimal object recognition model MD* (e.g., an optimal frame resolution) and the optimal sampling rate FS*. For the resource allocation engine 131 to calculate optimal PR-vFPGA resources, a result of profiling performed by the configuration controller 120 may be shared.

The task queue manager 132 may collectively manage tasks of an FPGA with respect to a plurality of video sequences. The task queue manager 132 may receive and manage a task processing request of each video sequence, provide meta information about the task processing request to the configuration controller 120 and the resource allocation engine 131, and determine optimal configuration values and allocation resources, thereby efficiently distributing resources.

While the task queue manager 132 is allocating resources to tasks, information in a service registry in which information regarding resources available for each service and kernel logic bit stream file information regarding applications that may be loaded and executed by the corresponding resources are stored and information in a resource registry in which information about current execution, allocation, and setting state information for each resource are stored may be referred to. In other words, the task queue manager 132 may identify information about currently available resources using the service registry and the resource registry. The task manager 130 may further include a device driver (not shown) for utilizing resources of each PR-vFPGA.

The first management module 133 or the second management module 136 may manage partial reconfiguration regions PBBs. The first management module 133 may include a first partial reconfiguration (PR) manager 134 and PR region managers 135, and the second management module 136 may include a second PR manager 137 and PR region managers 138. The task manager 130 may receive the object recognition model MD and the sampling rate FS and may output a mapping signal PRR for mapping the modified video sequence mVS to the FPGA block 150.

The first management module 133 or the second management module 136 may transplant the optimal object recognition model MD* to a PR-vFPGA according to optimal parameters, process a video sequence, and update information about the allocation resources of the PR-vFPGA in the resource registry.

The first management module 133 or the second management module 136 may receive information about particular tasks and PR-vFPGA resources to be allocated for each task, which are received from the resource allocation engine 131, and load service kernel logic to perform a reconfiguration, such that a requested task may be executed by allocated PR-vFPGA resources. In this case, information about a PR-vFPGA reconfiguration status for each task may be updated in the resource registry.

In some embodiments, the first management module 133 or the second management module 136 may load a device driver and a dynamic library for a partial reconfiguration region corresponding to the PR-vFPGA to access resources divided in a hardware manner. The first management module 133 or the second management module 136 may configure an environment in which service application calculation processing may be performed and may process a service application calculation by loading service kernel logic to accessible PR-vFPGA resources and performing a logic reconfiguration.

As a result of processing by the first management module 133 or the second management module 136, the mapping signal PRR for mapping each of the modified video sequences mVS to each of partial reconfiguration regions of the FPGA block 150 may be output. In an example embodiment, when a first video sequence VS1 is optimized by a first sampling rate FS1 and a first object recognition model MD1, the task manager 130 may transplant the first sampling rate FS1 and the first object recognition model MD1 into a first virtual FPGA vFPGA1 from among the plurality of vFPGAs of the FPGA block 150, and the task manager 130 may map the first video sequence VS1 to the first vFPGA1. Similarly, when it is determined that a second video sequence VS2 following the first video sequence VS1 is optimized by a second sampling rate FS2 and a second object recognition model MD2, the task manager 130 may transplant the second sampling rate FS1 and the second object recognition model MD2 into a second virtual FPGA vFPGA2 from among the plurality of vFPGAs, and the task manager 130 may map the second video sequence VS2 to the second virtual FPGA vFPGA2.

As may be understood from the foregoing, the task manager 130 according to embodiments of the inventive concept may reduce an additional latency caused in a process of performing tasks of various services by minimizing the number of reconfigurations.

Figure 5:
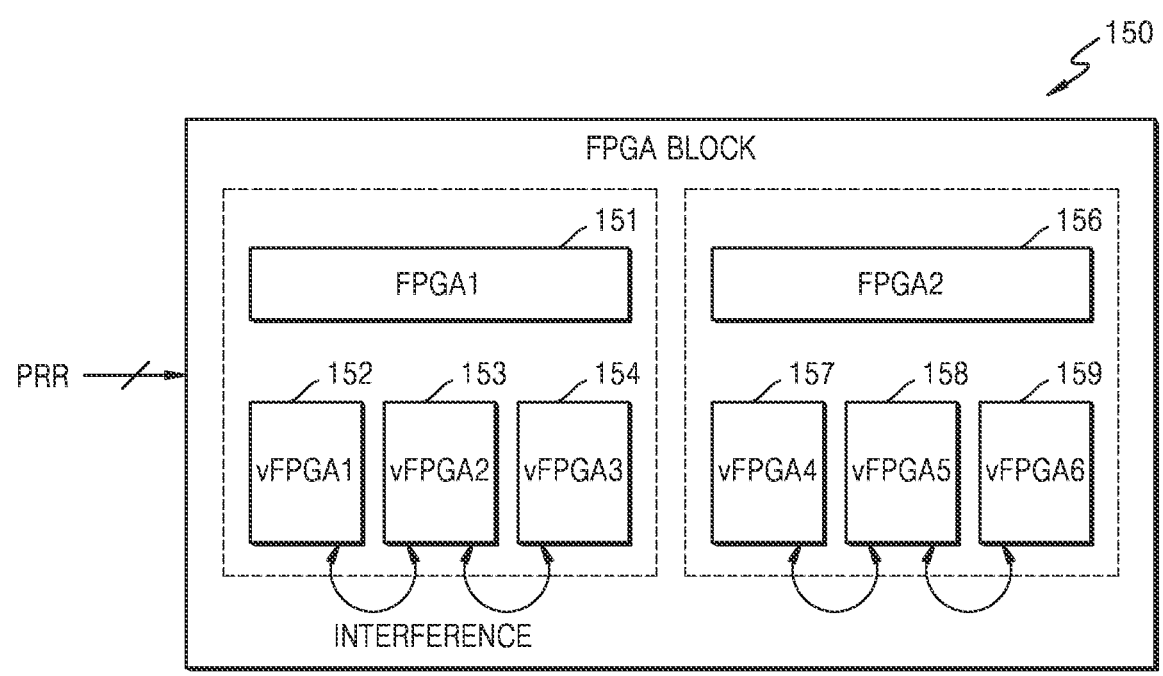
FIG. 5 is a block diagram further illustrating in one example the FPGA block 150 of FIG. 1.

FIG. 5 is a block diagram further illustrating in one example the FPGA block 150 of FIG. 1.

Referring to FIG. 5, the FPGA block 150 may include a first FPGA 151 and a second FPGA 156. The first FPGA 151 may include a first virtual FPGA vFPGA1 152, a second virtual FPGA vFPGA2 153, and a third virtual FPGA vFPGA3 153, and the second FPGA 156 may include a fourth virtual FPGA vFPGA4 157, a fifth virtual FPGA vFPGA5 158, and a sixth virtual FPGA vFPGA6 159. Although this example assumes that one FPGA includes three (3) vFPGA, the scope of the inventive concept is not limited thereto, and any reasonable numbers of virtual FPGAs may correspond to a single physical FPGA.

A PR-vFPGA is one vFPGA having partial logic resources of one physical FPGA and capable of operating an independent service and a digital logic according to the independent service. PR divides FPGA internal logic resources into several resources to enable independent logic transplantation and operation and also ensure independence in a subsequent logic reconfiguration.

In some embodiments, the FPGA block 150 may process each of the modified video sequences mVS in an individual vFPGA as the mapping signal PRR is received. Thus, in the vFPGA may be configured with optimized parameters for the modified video sequence.

One partial reconfiguration region allocated through partial reconfiguration may be allocated to an application through a host operating system. In this case, a PR-vFPGA may function as one independent processing device. In other words, a PR-vFPGA may perform independent video analysis processing regardless of other PR-vFPGAs.

However, because the PR-vFPGA corresponds to one physical FPGA, that is, the first or the second FPGA 151 or 156, and multiple video sequences may be concentrated to the one physical FPGA, that is, the first or the second FPGA 151 or 156, interference like a bottleneck may occur between PB-vFPGAs. The interference is directly related to the performance deterioration of an FPGA.

For example, there may be interference between the first virtual FPGA vFPGA1 152 and the second virtual FPGA vFPGA2 153. Similarly, there may be interference may between the second virtual FPGA vFPGA2 153 and the third virtual FPGA vFPGA3 154. Similarly, interference may occur between neighboring vFPGAs. Although not shown, a plurality of virtual FPGA vFPGAs included in the one physical FPGA, that is, the first or the second FPGA 151 or 156, are affected by interference there between.

According to embodiments of the inventive concept, deterioration of throughput of an FPGA caused by interference between associated vFPGAs may be minimized. Also, a reconfigurable logic circuit and a method of operating the reconfigurable logic circuit according to the inventive concept may secure real-time performance of video processing, satisfy minimum-required accuracy, and minimize processing latency.

Figure 6:
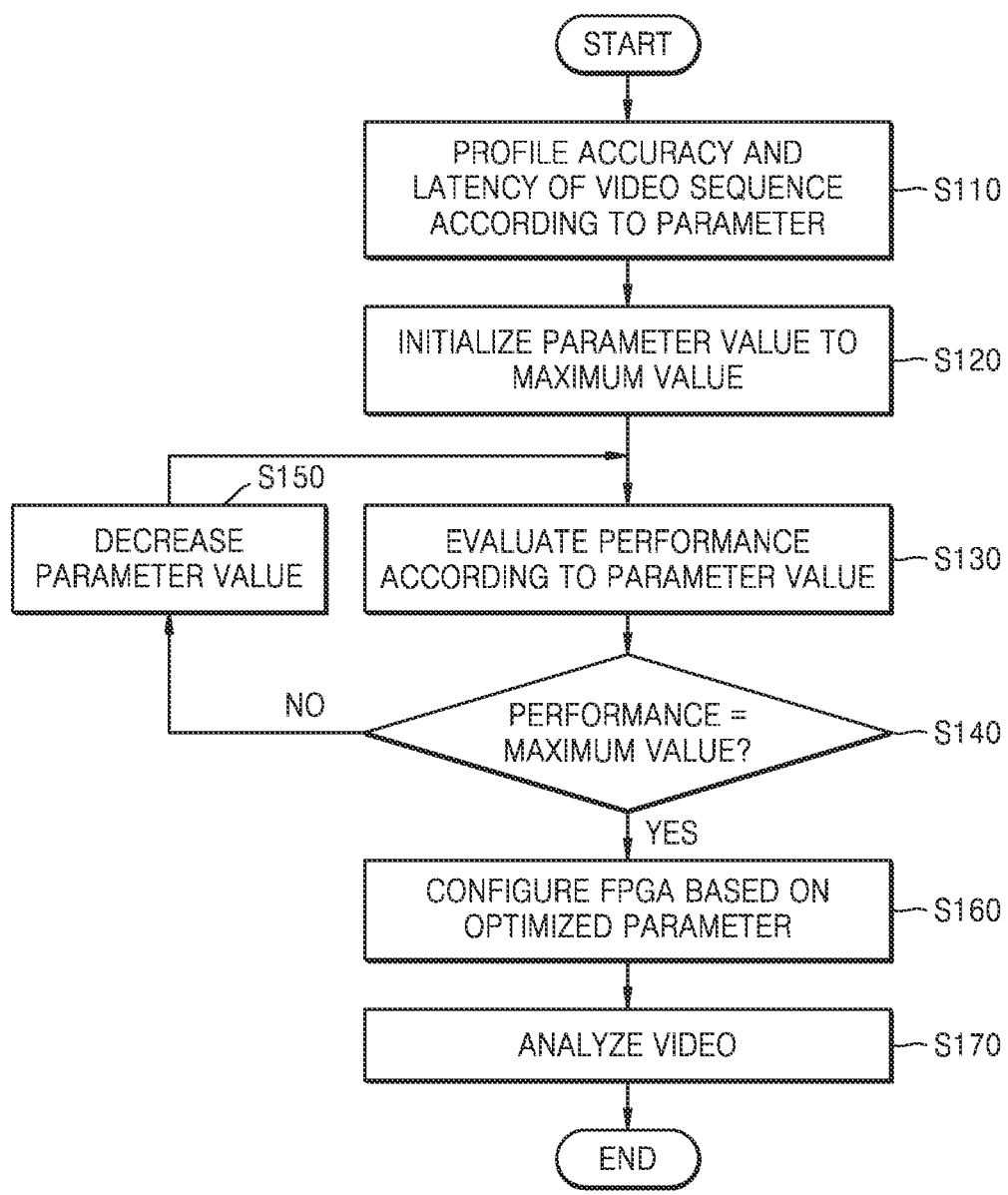
FIG. 6 is a flowchart illustrating a method of operating a reconfigurable logic circuit according to embodiments of the inventive concept.
Figure 8:
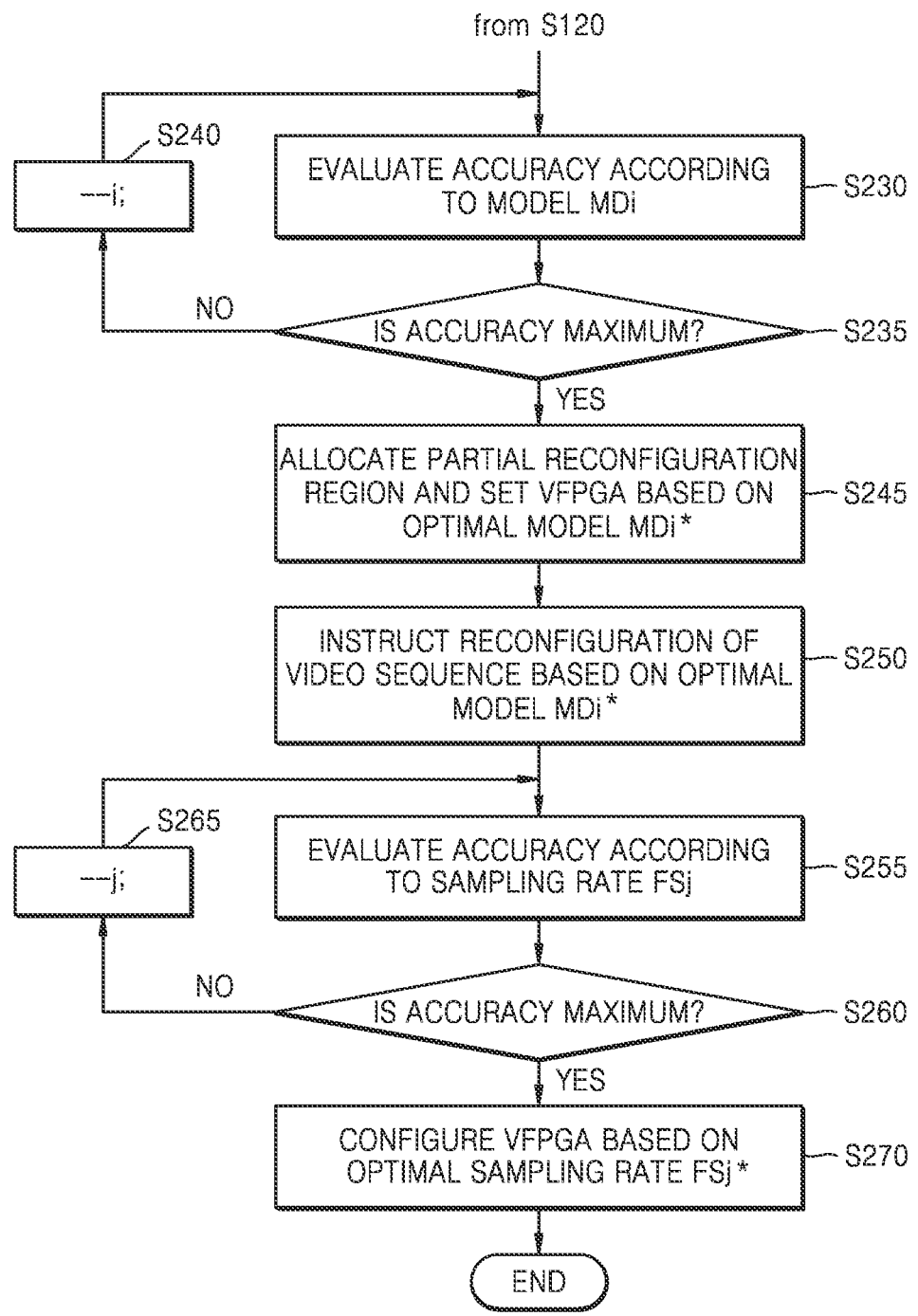
FIGS. 8 and 9 are respective flowcharts illustrating of methods of operating a reconfigurable logic circuit according to embodiments of the inventive concept.

FIGS. 6 and 8 are collectively a flowchart illustrating in one example a method of operating a reconfigurable logic circuit according to embodiments of the inventive concept.

Initially referring to FIGS. 1, 3 and 6, a case is illustrated in which one parameter is applied to a reconfigurable logic circuit. Thus, the profiler 121 of the configuration controller 120 may profile an accuracy Q and a latency L of a video sequence according to a parameter (S110). The accuracy Q and the latency L may be the throughput of the FPGA block 150 for a video sequence performed. Here, the profiler 121 may test all sampling rate values or all object recognition model values as parameter values and may simulate the processing latency L and the processing accuracy Q of the FPGA block 150 according to a result of applying the parameter values. A process performance checking operation for parameters may be performed before a video sequence is input.

Then, the configuration determiner 123 of the configuration controller 120 may initialize parameters value to maximum values (S120). Thus, the configuration determiner 123 may initialize a value of the sampling rate FS or the object recognition model MD of each video sequence to a maximum value. A sampling rate $vs_i$ and an object recognition model $FS_i$ for video frames of an i-th video sequence $MD_i$ may have selectable ranges, respectively. The maximum selectable value of the sampling rate $FS_i$ is $s_{max}$, and the maximum selectable value of the object recognition model $MD_i$ is $r_{max}$.

The configuration controller 120 may evaluate the performance of the FPGA block 150 for parameter values (S130). Performance evaluation may be based on a profiling result. in some embodiments, because the profiler 121 may store a result of pre-testing the FPGA throughput of all parameter values, the configuration controller 120 may compare performance with regard to a current parameter value with performance with regard to a parameter value that is one level lower than the current parameter value. From between the performance according to the current parameter value and the performance according to a parameter value that is one level lower than the current parameter value, a value corresponding to a lower processing accuracy performance deterioration rate of a video processing sequence per processing latency reduction rate of the video sequence may be set to a maximum value.

The performance according to the current parameter value may be compared to the performance according to the maximum value may (S140). Accordingly, when the performance according to the current parameter value is not the maximum value (S140=NO), the configuration controller 120 may decrease the current parameter value by one level (S150). Otherwise, when the performance according to the current parameter value is the maximum value (S140=YES), the current parameter value may be determined to be an optimal parameter value (S160). In this manner, an optimal parameter may be used to set an FPGA. In other words, the FPGA block 150 may transplant the optimal parameter. For example, the optimal parameter may be transplanted to the FPGA block 150.

Then, the FPGA block 150 may analyze a video sequence and perform object recognition for the video sequence (S170).

Figure 7:
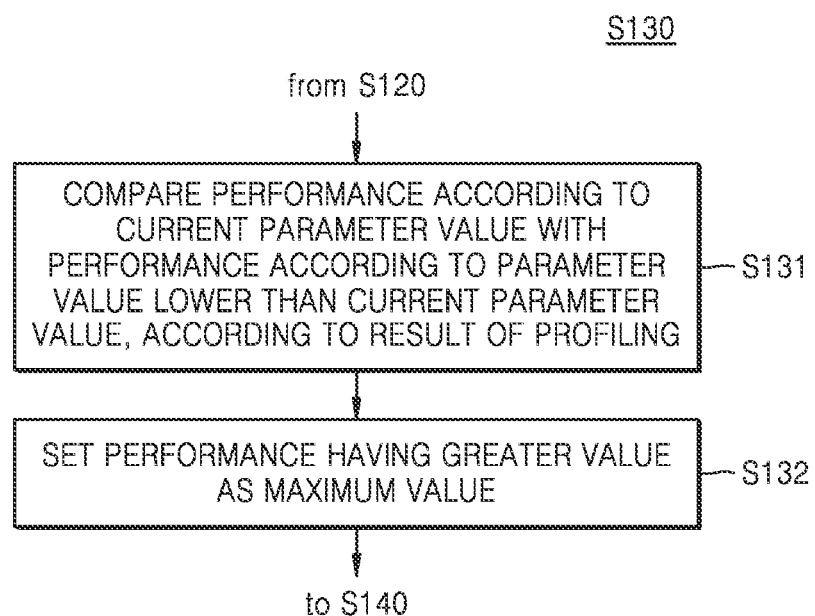
FIG. 7 is a flowchart further illustrating in one example the method step S130 of the flowchart of FIG. 6.

FIG. 7 is a flowchart further illustrating in one example the method step S130 of FIG. 6.

Following the initialization of parameters value to maximum values by the configuration determiner 123 of the configuration controller 120 (S120), performance according to the current parameter value may be compared with performance according to a parameter value having a level lower than the current parameter value based on a profiling result (S131). The performance may indicate a rate of a processing accuracy deterioration of a video sequence per processing latency reduction rate of the video sequence.

Then, based on a result of comparing the performance according to the current parameter value with the performance according to the parameter value having a level lower than the current parameter value, performance having a greater value may be set as a maximum value (S132). The maximum value may be used to determine whether the current parameter value is an optimal parameter value.

Referring now to FIGS. 1, 3 and 8, following the completion of the method step S120 of FIG. 6, processing accuracy according to an object recognition model MDi of an FPGA for processing a video sequence may be evaluated (S230). In some embodiments, the model selector 125 may be used to compare an accuracy for an index value i of a current object recognition model MD with an accuracy of an index value i' of an object recognition model MD that is a level lower than the current object recognition model MD.

Thus, the model selector 125 may determine whether processing accuracy is a maximum value (S235). When the processing accuracy is not the maximum value (S235=NO), the model selector 125 may lower the index value i of the current object recognition model MD by one level (−i) (S240). However, when the processing accuracy is the maximum value (S235=YES), the model selector 125 may set the index value i of the current object recognition model MD as the optimal object recognition model value MD* (S245). Then, the model selector 125 may allocate a partial reconfiguration region of the FPGA block 150 and may configure a virtual FPGA vFPGA based on the optimal object recognition model value MD* (S245).

Then, the configuration controller 120 may instruct the client 200 to reset a video sequence based on an optimal object recognition model value MDi* (S250). The client 200 may down-sample the video sequence to have a particular resolution based on the optimal object recognition model value MDi*.

When the object recognition model MD of each video sequence is fixed, a sampling rate FS that may minimize interference occurring in an FPGA shared by a plurality of video sequences and performance deterioration caused by the interference may be further determined through a greedy algorithm. The higher the sampling rate is set to be, the higher video analysis accuracy becomes. However, interference occurring in an FPGA also increases. On the other hand, the lower the sampling rate is set to be, the lower the video analysis accuracy becomes. However, interference occurring in an FPGA also decreases.

Then, processing accuracy according to a sampling rate FSj of an FPGA for processing a video sequence may be evaluated (S255). Here, the sampling rate selector 127 may compare an accuracy for an index value j of a current sampling rate FS with an accuracy of an index value j' of a sampling rate FS that is a level lower than the current sampling rate FS.

The sampling rate selector 127 may then determine whether processing accuracy is a maximum value (S260). When the processing accuracy is not the maximum value (S260=NO), the sampling rate selector 127 may lower the index value j of the current sampling rate FS by one level (−j) (S265). However, when the processing accuracy is the maximum value (S260=YES), the sampling rate selector 127 may set the index value j of the current sampling rate FS as the optimal sampling rate value FS* (S270). The sampling rate selector 127 may allocate a partial reconfiguration region of the FPGA block 150 and may configure a virtual FPGA vFPGA based on the optimal object recognition model value MD*.

According to the above-described method, accuracy deterioration for video analysis for a plurality of video sequences in the server 100 including an FPGA may be minimized.

Figure 9:
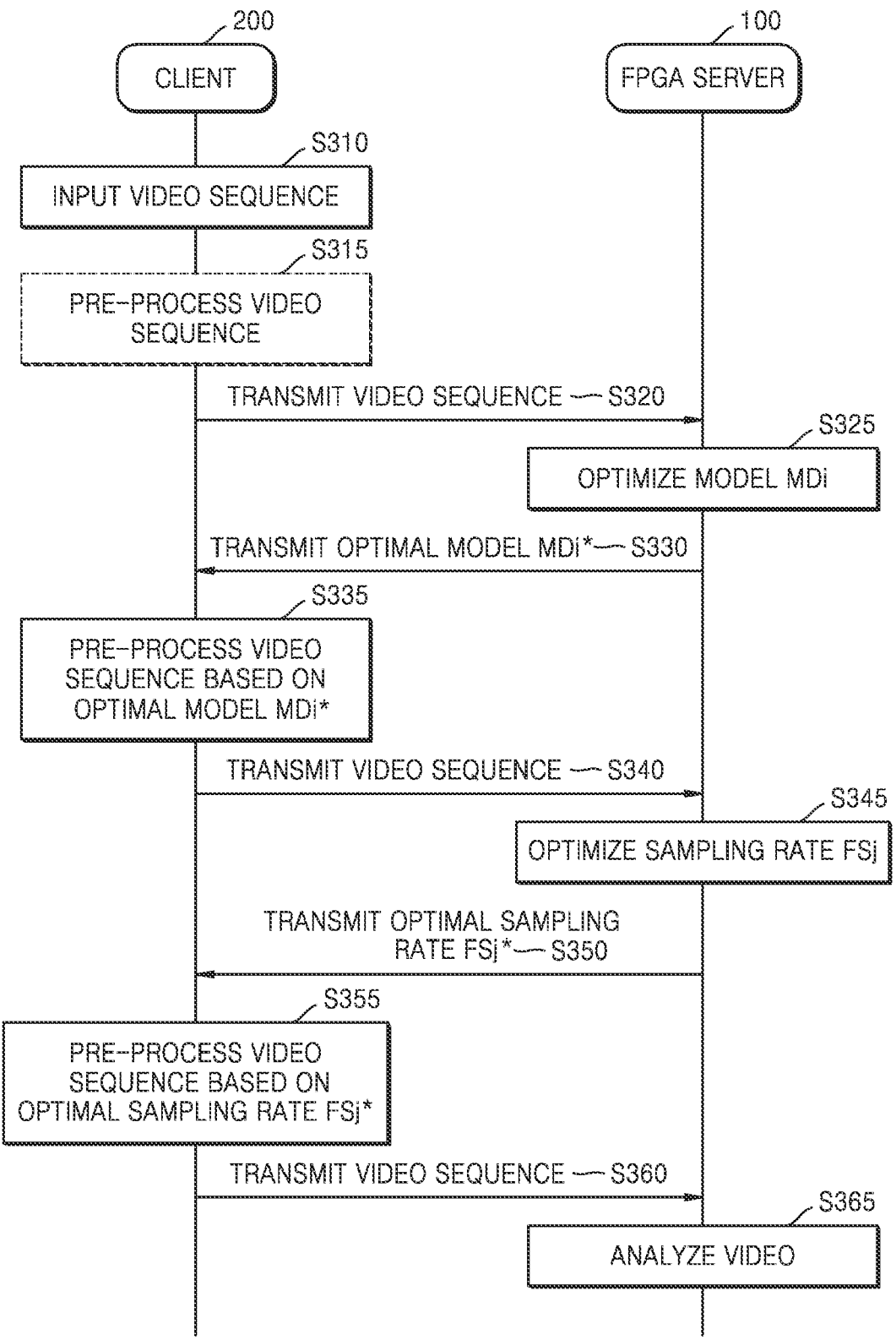

FIG. 9 is a flow diagram illustrating a method of operating an electronic system 10 including the server 100 as a reconfigurable logic circuit according to embodiments of the inventive concept.

A video sequence VS may be input to the client 200 (S310).

The client 200 may perform pre-processing on the video sequence VS. The pre-processing may include sampling (or down-sampling) the video sequence VS at a predetermined sampling rate or resolution to facilitate processing of the video sequence VS by the server 100 (S315). In some embodiments, the pre-processing may be performed by the processor 210 of the client 200, but the inventive concept is not limited thereto. According to an example embodiment, the client 200 may transmit raw data to the server 100 as it is, and the raw data may be processed by the CPU 140 of the server 100.

The video sequence VS may be transmitted from the client 200 to the server 100 after being pre-processed or without being pre-processed (S320), and the server 100 may optimize the object recognition model MD (S325). In some embodiments, the server 100 may optimize the object recognition model MD by searching for the optimal object recognition model value MD*, which is a value that maximizes the performance of processing the video sequence by decreasing the value of the object recognition model MD based on a profiling result.

In some embodiments, optimization of the object recognition model MD may include comparing the throughput according to the index value i of the current object recognition model MD with the throughput according to the index value i' of the object recognition model MD that is lower than the index value i of the current object recognition model MD according to a profiling result, setting the throughput having a larger value as a maximum value according to a result of the comparing, decreasing (−i) the index value i of the current object recognition model MD when the throughput according to the current object recognition model MD is not the maximum value, and determining the index value i of the current object recognition model MD as the optimal object recognition model value MD* when the throughput according to the current object recognition model MD is the maximum value.

Then, the optimal object recognition model value MDi* may be transmitted to the client 200 (S330), and the client 200 may pre-process the video sequence VS based on the optimal object recognition model value MDi* (S335). Therefore, the client 200 may down-sample the video sequence to have a particular resolution based on the optimal object recognition model value MDi*.

A down-sampled modified video sequence mVS may be transmitted to the server 100 (S340), and the server 100 may optimize the sampling rate FS (S345). In some embodiments, the server 100 may optimize the sampling rate FS by searching for an optimal sampling rate value FS* which is a value that maximizes the performance of processing the video sequence by decreasing the sampling rate FS based on a profiling result.

In some embodiments, optimization of the sampling rate FS may include comparing the throughput according to the index value j of the current sampling rate FS with the throughput according to the index value j' of the sampling rate FS that is lower than the index value j of the current sampling rate FS according to a profiling result, setting the throughput having a larger value as a maximum value according to a result of the comparing, decreasing (−j) the index value j of the current sampling rate FS when the throughput according to the current sampling rate FS is not the maximum value, and determining the index value j of the current sampling rate FS as the optimal sampling rate value FS* when the throughput according to the current sampling rate FS is the maximum value.

Then, the optimal sampling rate value FS* may be transmitted to the client 200 (S350), and the client 200 may pre-process the video sequence VS based on the optimal object recognition model value MDi* and the optimal sampling rate value FS* (S355). Therefore, the client 200 may sample the video sequence VS to have a particular resolution and a particular sampling rate based on the optimal object recognition model value MDi* and the optimal sampling rate value FS*.

Then, a sampled modified video sequence mVS may be transmitted to the server 100 (S360) and analyzed (S365).

Figure 10:
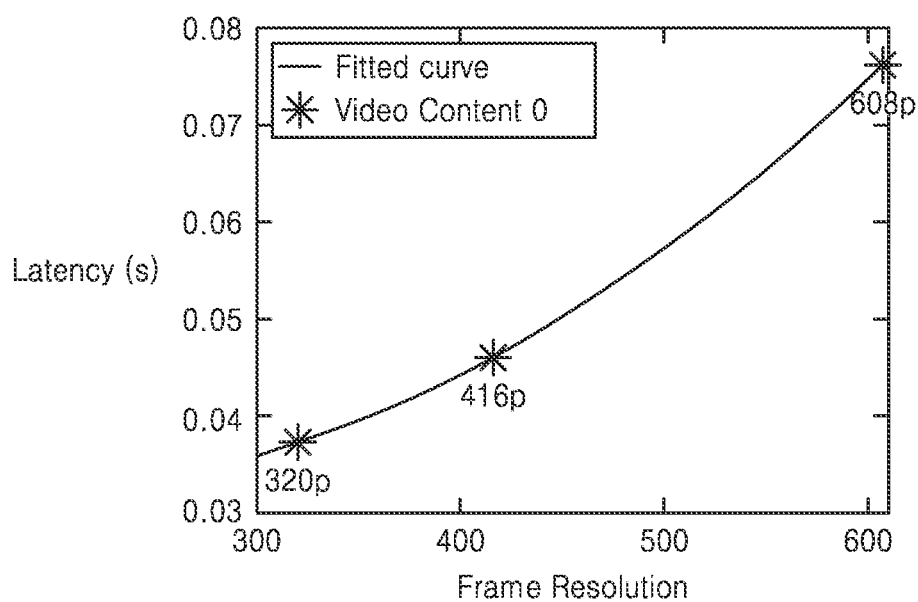
FIG. 10 is a graph illustrating latency in video sequence throughput of a reconfigurable logic circuit according to embodiments of the inventive concept.

FIG. 10 is a graph illustrating latency in video sequence throughput of a reconfigurable logic circuit according to embodiments of the inventive concept. Here, the graph of FIG. 10 further illustrates Equation 2 above, wherein the horizontal axis of the graph is an object detection model and indicates values of a frame resolution, and the vertical axis indicates a processing delay time.

According to Equation 2, a latency per second of the PR-vFPGA of the i-th video sequence to which a partial reconfiguration region is allocated and an object recognition model MD may increase as the value of the object recognition model MD increases. For example, the latency when the frame resolution is 416×416 may be greater than the latency when the frame resolution is 320×320, and the latency when the frame resolution is 608×608 may be greater than the latency when the frame resolution is 416×416. In Equation 2, because the second order term is the highest order term DEGREE, the latency may exponentially increase as the object recognition model MD (e.g., a resolution) increases.

Figure 11A:
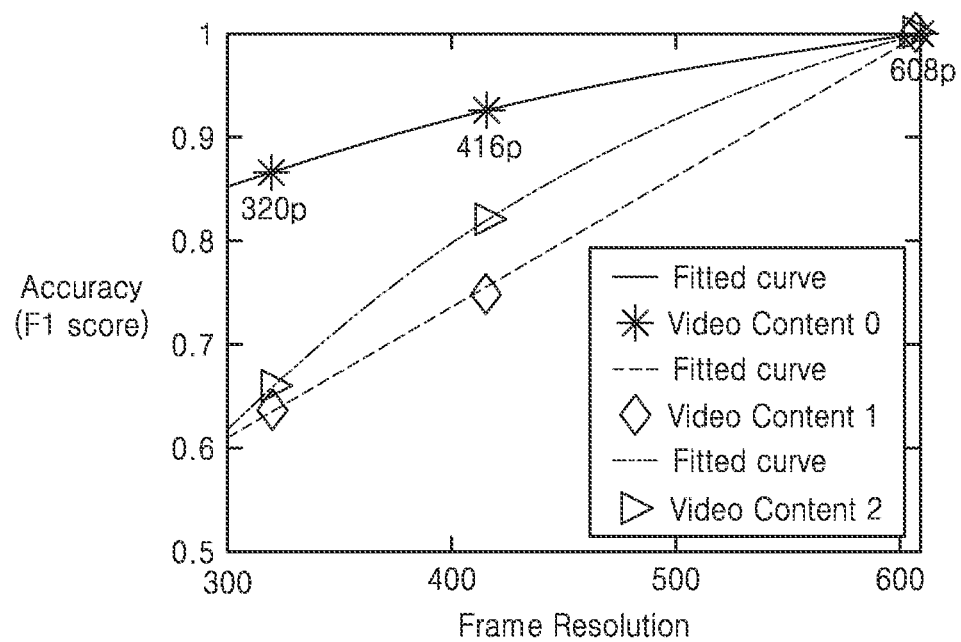
FIGS. 11A and 11B are respective graphs illustrating accuracy in video sequence throughput of a reconfigurable logic circuit according to an example embodiment of the inventive concept.
Figure 11B:
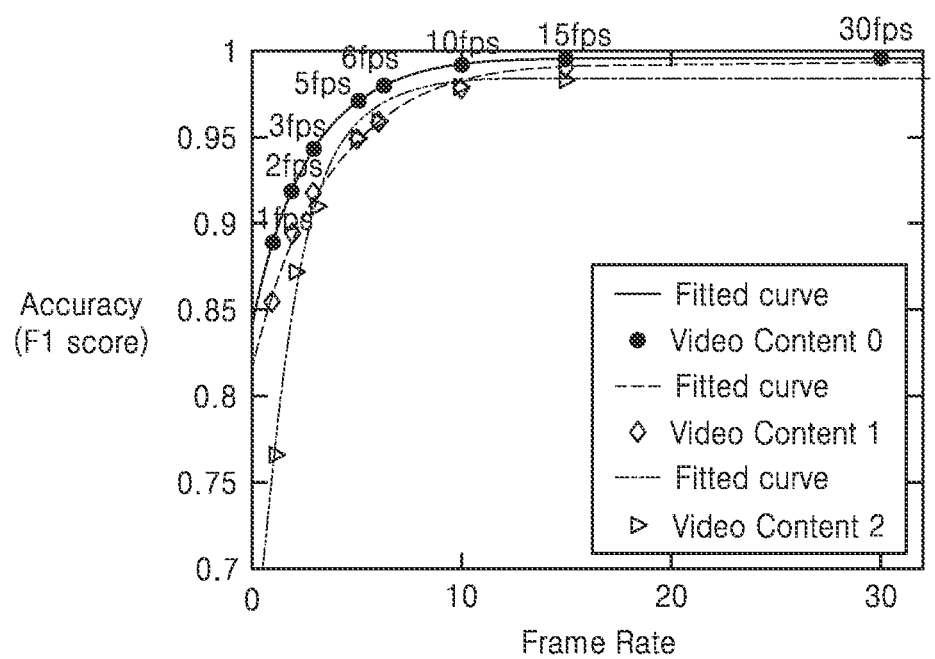

FIGS. 11A and 11B are graphs illustrating accuracy in video sequence throughput of a reconfigurable logic circuit according to embodiments of the inventive concept.

FIG. 11A is a graph illustrating Equation 5 above, wherein the horizontal axis represents values of a frame resolution in an object detection model, and the vertical axis represents processing accuracy. According to Equation 5, the higher a frame resolution is, the higher a processing accuracy becomes. Also, the higher the frame resolution is, the smaller the performance improvement may become.

A plurality of video sequences may have different characteristics. In an example embodiment, the accuracy of a first video sequence Video Content 0 may not be relatively significantly deteriorated even when the resolution is changed. For example, the accuracy of the first video sequence Video Content 0 when the resolution is 320×320 is 1. That is, the accuracy of the first video sequence Video Content 0 when the resolution is 608×608 may be higher than 0.8.

In an example embodiment, the accuracy of a second video sequence Video Content 1 may be relatively significantly deteriorated according to a change in the resolution. For example, the accuracy of the second video sequence Video Content 1 when the resolution is 608×608 is 1. That is, the accuracy of the second video sequence Video Content 1 when the resolution is 320×320 may be below 0.6.

FIG. 11B is a graph illustrating Equation 6 above, wherein the horizontal axis represents values of a sampling rate regarding frames in an object detection model (that is, a frame rate), and the vertical axis represents processing accuracy.

According to Equation 6, the higher a sampling rate is, the higher a processing accuracy becomes. Also, the higher the sampling rate is, the smaller the performance improvement may become.

A plurality of video sequences may have different characteristics, as described above with reference to FIG. 11A. Here, the accuracy of a first video sequence Video Content 0 may not be relatively significantly deteriorated even when the resolution is changed. For example, the accuracy of the first video sequence Video Content 0 when the sampling rate is 30 fps is 1. That is, the accuracy of the first video sequence Video Content 0 when the sampling rate is 1 fps may be higher than 0.8.

Here, the accuracy of a third video sequence Video Content 2 may be relatively significantly deteriorated according to a change in the sampling rate. For example, the accuracy of the third video sequence Video Content 2 when the sampling rate is 30 fps is 1. Meanwhile, the accuracy of the third video sequence Video Content 2 when the sampling rate is 1 fps may be below 0.8.

Referring to FIGS. 11A and 11B, accuracy is not significantly decreased for a sampling rate and an object recognition model having large values, but is gradually decreased. However, accuracy is rapidly decreased for a frame sampling rate and an object recognition model having small values. As described above, since a plurality of video sequences have different imaging scenarios, the video sequences may have different characteristics. Therefore, according to embodiments of the inventive concept, by gradually decreasing a parameter, performance corresponding to each parameter is checked one by one, thereby searching for a parameter that maximizes the performance.

Figure 12:
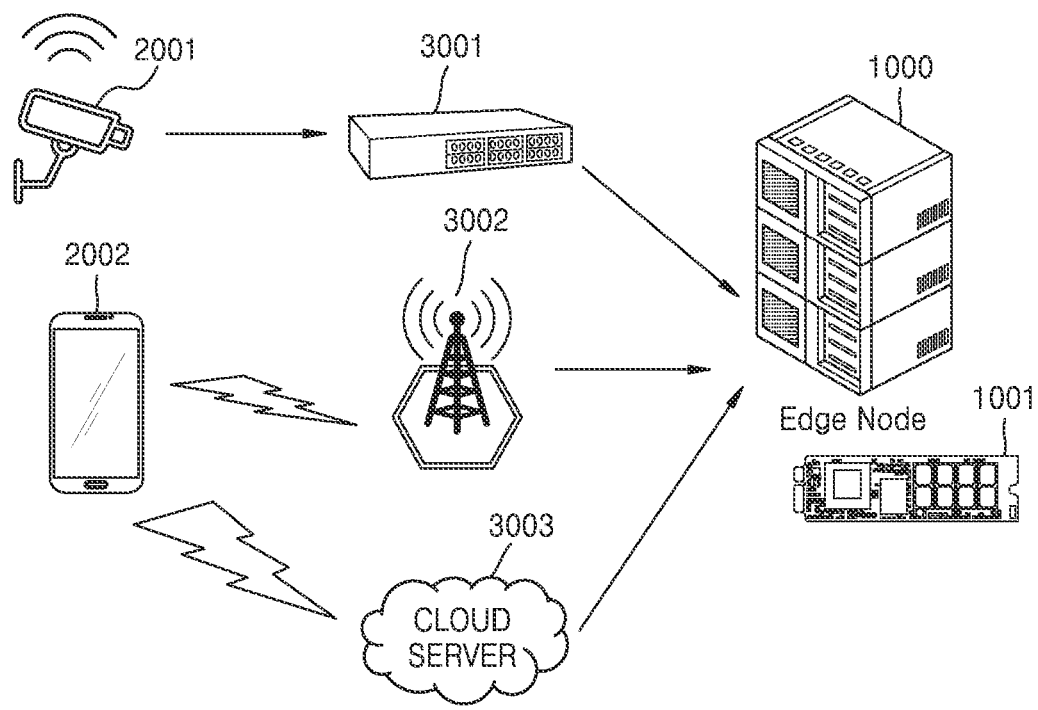
FIG. 12 is a conceptual diagram illustrating data communication in an electronic system according to embodiments of the inventive concept.

FIG. 12 is a conceptual diagram illustrating data communication in an electronic system according to embodiments of the inventive concept.

The client 200 of FIG. 1 may correspond to a wired electronic device 2001 or a wireless electronic device 2002 of FIG. 12, and the server 100 of FIG. 1 may correspond to a server 1000 of FIG. 12. The server 1000 may be referred to as an edge node in an MEC environment. The FPGA block 150 of FIG. 1 may correspond to an FPGA 1001 of FIG. 12. The FPGA 1001 may be included in the edge node or provided adjacent to the edge node.

Since the wired electronic device 2001 transmits a video sequence through a wire, a transmission loss may occur. Therefore, the wired electronic device 2001 may access the server 1000 through a router 3001. According to an example embodiment, when the wired electronic device 2001 is relatively close to the server 1000, the wired electronic device 2001 may access the server 1000 without the router 3001.

The wireless electronic device 2002 may communicate with a base station 3002 or may exchange a video sequence with a cloud server 3003, through a wireless network. The base station 3002 may provide a video sequence to the server 1000. The cloud server 3003 may provide a video sequence to the server 1000. The server 1000 may be located within the base station 3002 or at a location adjacent to the base station.

Referring to the electronic system of FIG. 12, the wired electronic device 2001 or the wireless electronic device 2002 may exchange a video sequence with the server 1000 through various communication networks.

While the inventive concept has been particularly shown and described with reference to embodiments thereof, it will be understood that various changes in form and details may be made therein without departing from the spirit and scope of the following claims.

What is claimed is:

1. A method of operating a server including a reconfigurable logic circuit, the method comprising:
   receiving, at a receiver of the server, a video sequence;
   profiling, by a control circuit of the server, throughput of the video sequence with regard to a parameter constituting the reconfigurable logic circuit to generate a profiling result;
   initializing, by the control circuit of the server, the parameter to a maximum value;
   evaluating, by the control circuit of the server, throughput of the video sequence with regard to a current parameter value based on the profiling result;
   decreasing, by the control circuit of the server, the current parameter value when throughput with regard to the current parameter value is not a maximum value, and determining that the current parameter value is an optimal parameter when throughput with regard to the current parameter value is the maximum value; and
   analyzing the video sequence based on the optimal parameter to perform object recognition for the video sequence.

2. The method of claim 1, wherein the parameter is a sampling rate of the video sequence.

3. The method of claim 1, wherein the parameter is a type of an object recognition model for analyzing the video sequence.

4. The method of claim 3, wherein the parameter is a resolution of the video sequence.

5. The method of claim 1, wherein throughput of the video sequence includes at least one of processing latency and processing accuracy.

6. The method of claim 1, wherein the evaluating of throughput of the video sequence according to the current parameter value comprises:
   comparing throughput with regard to the current parameter value with throughput with regard to a parameter value lower than the current parameter value based on the profiling result to generate a comparison result; and setting throughput having a greater value as the maximum value according to the comparison result.

7. The method of claim 1, wherein the reconfigurable logic circuit includes a field programmable gate array (FPGA).

8. The method of claim 7, wherein the FPGA is partially reconfigurable and supports a virtual FPGA.

9. A method of operating a server including reconfigurable logic circuit, the method comprising:
   receiving, by a receiver of the server, a video sequence;
   profiling, by a configuration controller of the server, throughput of the video sequence with regard to parameters of the reconfigurable logic circuit including a first parameter and a second parameter to generate a profiling result;
   initializing, by a configuration controller of the server, the first parameter to a first maximum value;
   initializing, by a configuration controller of the server, the second parameter to a second maximum value;
   optimizing, by a configuration controller of the server, the first parameter by searching for a first optimal parameter value maximizing throughput of the video sequence by decreasing a first parameter value of the first parameter based on the profiling result;
   receiving, by the receiver of the server, a modified video sequence resulting from a processing of the video sequence based on the first optimal parameter value;
   optimizing, by a configuration controller of the server, the second parameter by searching for a second optimal parameter value maximizing throughput of the modified video sequence by decreasing a second parameter value of the second parameter based on the profiling result;
   reconfiguring, by a central processing unit of the server, the reconfigurable logic circuit according to the first and second optimal parameters; and
   analyzing the modified video sequence based on the first optimal parameter value and the second optimal parameter value to perform object recognition for the video sequence.

10. The method of claim 9, wherein the first parameter is a sampling rate of the video sequence, and the second parameter is a type of an object recognition model for analyzing the video sequence.

11. The method of claim 10, wherein the second parameter includes multiple resolutions varying in accordance with types of the object recognition model.

12. The method of claim 9, wherein throughput of the video sequence includes at least one of processing latency and processing accuracy.

13. The method of claim 9, wherein the optimizing of the first parameter comprises:
   comparing throughput with regard to a first parameter value, which is a current parameter value of the first parameter, with throughput for a parameter value, which is lower than the first parameter value, according to the profiling result to generate a comparison result, and setting throughput having a greater value as the maximum value based on the comparison result;
   decreasing the first parameter value when throughput of the first parameter value is not the maximum value; and
   determining the first parameter value as the first optimal parameter value when throughput of the first parameter value is the maximum value.

14. The method of claim 9, wherein the optimizing of the second parameter comprises:
   determining values to which the first optimal parameter value is applied from the profiling result;
   comparing throughput with regard to a second parameter value, which is a current parameter value of the second parameter, with throughput of a parameter value, which is lower than the second parameter value, according to the profiling result to generate a comparison result, and setting throughput having a greater value as the maximum value based on comparison result;

decreasing the second parameter value when throughput of the second parameter value is not the maximum value; and determining the second parameter value as the second optimal parameter value when throughput of the second parameter value is the maximum value.

15. The method of claim 9, further comprising:

transmitting a command corresponding to the first optimal parameter value to a client; and receiving the video sequence to which the first optimal parameter value is applied.

16. The method of claim 9, transmitting a command corresponding to the second optimal parameter value to a client; and receiving the video sequence to which the second optimal parameter value is applied.

17. The method of claim 9, wherein the reconfigurable logic circuit is partially reconfigurable and includes a field programmable gate array (FPGA) supporting a virtual FPGA.

18. A server including reconfigurable logic circuit, the server comprising:

a receiver configured to receive a video sequence from a user device;

a field programmable gate array (FPGA) block including at least one virtual FPGA (vFPGA);

a configuration controller configured to profile the video sequence for a parameter and search for an optimal parameter value that maximizes throughput of the FPGA block for the video sequence;

a central processing unit configured to reconfigure the FPGA block for the optimal parameter; and a task manager configured to map the video sequence to the at least one vFPGA to which the optimal parameter value is applied, wherein the configuration controller gradually decreases a parameter value of the parameter from a maximum value to determine a deterioration rate of accuracy throughput of the video sequence per latency reduction rate for processing the video sequence at each decreased parameter value, and to determine a parameter having the smallest deterioration rate of accuracy throughput of the video sequence per latency reduction rate for processing the video sequence as an optimal parameter.

19. The reconfigurable logic circuit of claim 18, wherein the task manager is further configured to map the video sequence to an optimal vFPGA configured with regard to the optimal parameter value from among the at least one vFPGA.

20. The reconfigurable logic circuit of claim 18, wherein the parameter includes at least one of a sampling rate of the video sequence and a type of an object recognition model for analyzing the video sequence, and throughput for the video sequence includes at least one of processing latency and processing accuracy.

* * * * *